Figure 1:
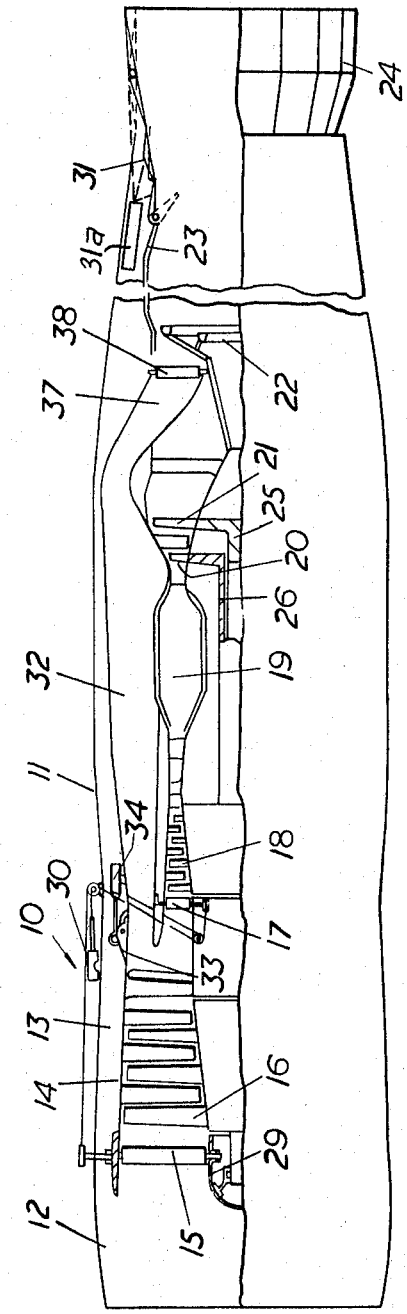

Jan. 10, 1967  J. G. KEENAN ETAL  3,296,800
GAS TURBINE POWER PLANT

Filed Dec. 6, 1963

3 Sheets-Sheet 1

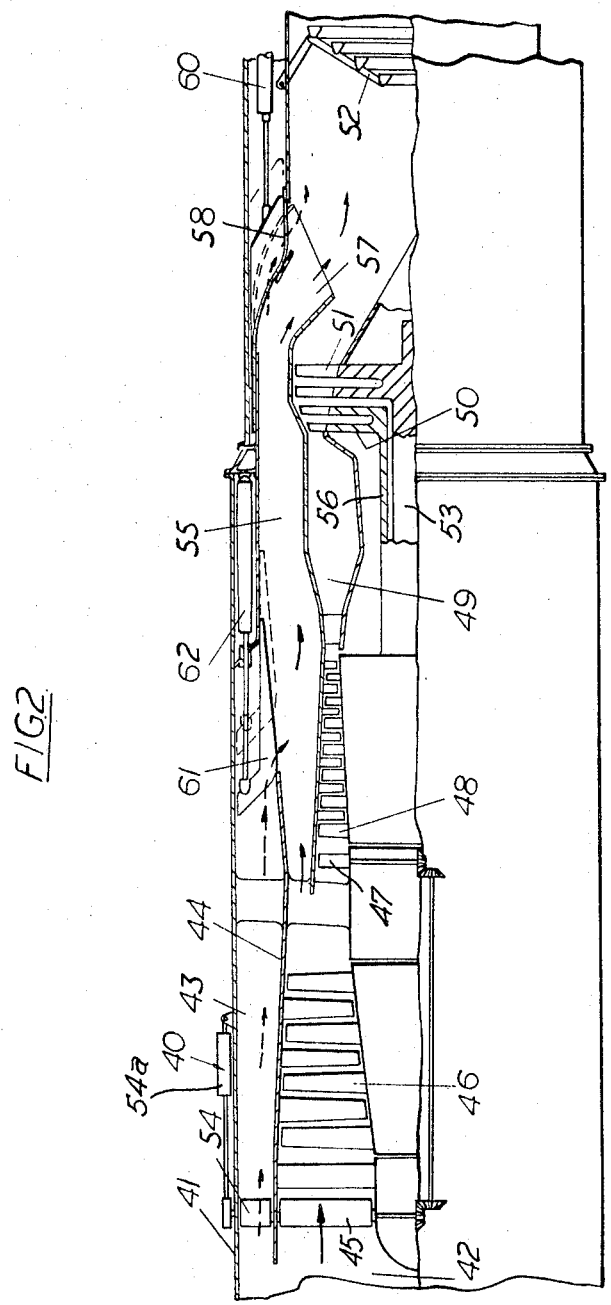

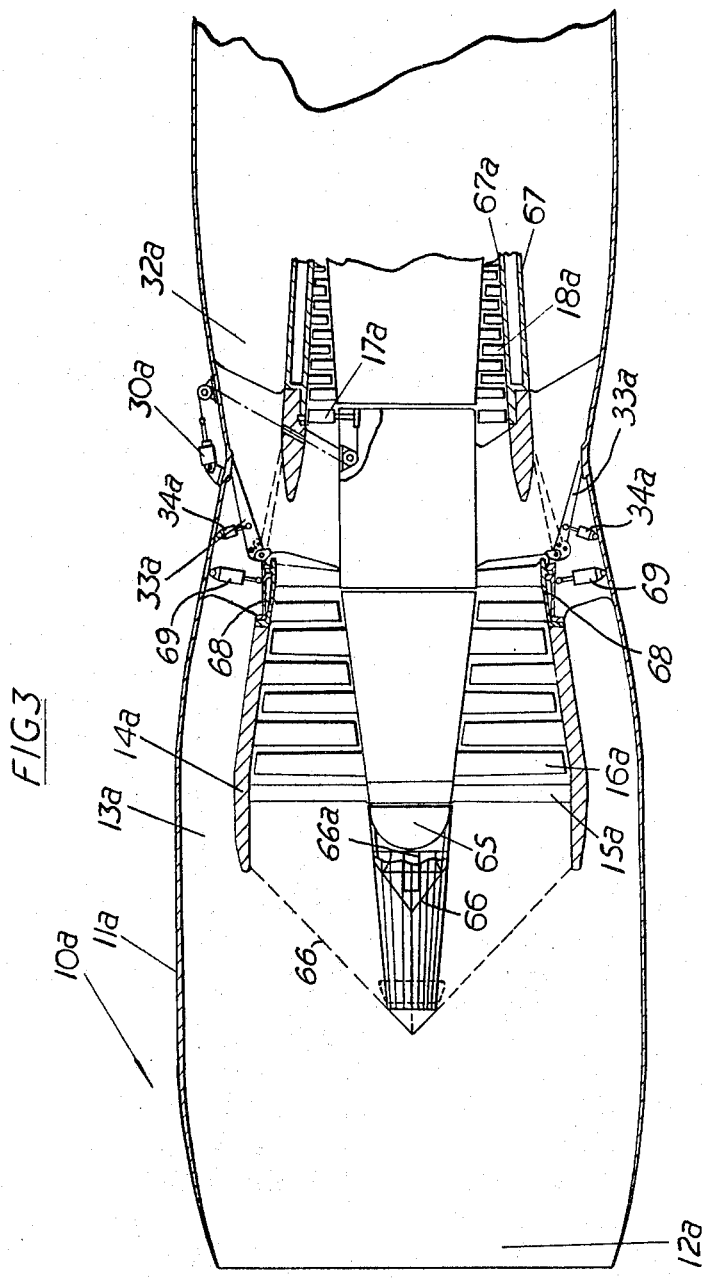

United States Patent Office 3,296,800
Patented Jan. 10, 1967

3,296,800
GAS TURBINE POWER PLANT
John Gregory Keenan, Derby, Jack Palfreyman, Tansley, and John Bertram Holliday, Derby, England, assignors to Rolls-Royce Limited, Derby, England, a company of Great Britain
Filed Dec. 6, 1963, Ser. No. 328,659
Claims priority, application Great Britain, Dec. 17, 1962, 47,629/62
7 Claims. (Cl. 60—244)

This invention concerns a gas turbine power plant which may, when necessary, be used as a ram-jet engine.

According to the present invention, there is therefore provided gas turbine power plant having a flow duct which is provided in flow series with an air intake passage, compressor means, primary combustion equipment, turbine means, and reheat combustion equipment; a by-pass duct whose upstream end communicates with the compressor means so as to receive part of the air which has been compressed therein, the by-pass duct by-passing the primary combustion equipment and the turbine means, and the downstream end of said by-pass duct having one or more openings which communicate with said flow duct upstream of the reheat combustion equipment; means for varying the effective areas of said one or more openings; and a supplementary air duct which is arranged to receive ram air from the air intake passage and which communicates with the by-pass duct, so as to supply the ram air thereto, by way of a valve device.

It will be appreciated that at speeds below a predetermined Mach number, the said valve device may be closed, the effective area of the said opening or openings may be maintained at a minimum, and the power plant may be operated (with or without reheat) as a by-pass gas turbine engine.

On the other hand, at speeds above the said predetermined Mach number, the said valve device may be opened to permit a flow of ram air into the by-pass duct, the primary combustion equipment may be shut down, the reheat combustion equipment may be maintained in operation, and the effective area of the said opening or openings may be maintained at a maximum, in which case the power plant will be operated as a ram-jet.

Flow control means, operable when required, are preferably provided for preventing flow from the air intake passage and through the compressor means.

Thus the compressor means may be provided with movable inlet guide vanes which constitute the flow control means, means being provided to effect movement of the movable inlet guide vanes between open and closed positions. The compressor means may, for example, comprise a low pressure compressor and a high pressure compressor each of which is provided with said movable inlet guide vanes.

Alternatively, the compressor means may be provided at its upstream end with a member which is mounted coaxially of the compressor means and which controls the flow of air thereinto, the said member having a plurality of relatively movable portions which may be moved relatively away from and towards each other to positions in which they respectively prevent and permit flow of air into the compressor means.

Flow control means, operable when required, are also preferably provided for preventing flow of ram air into the supplementary air duct.

The said valve device may be settable in a first position in which compressed air may pass from the compressor extend into the said flow duct upstream of the reheat combustion equipment, means being provided for altering the effective area of each said chute. Thus the last-mentioned means may comprise blocking members which may be introduced into and withdrawn from the chutes.

If desired, the downstream end of the supplementary air duct may communicate with an exhaust passage which is arranged to receive exhaust gases which have passed downstream of the reheat combustion equipment, the supplementary air duct by-passing the compressor means, primary combustion equipment, turbine means and reheat combustion equipment.

The said valve device may be settable in a first position in which compressed air may pass from the compressor means and into the by-pass duct and in which the supplementary air duct is blocked to the flow therethrough of ram air, and a second position in which compressed air is prevented from passing from the compressor means and into the by-pass passage and in which the supplementary air duct is open to a flow of ram air therethrough.

At least part of the said flow duct may have a double-walled casing, means being provided for passing a cooling fluid between the walls of said casing. Thus the last-mentioned means may comprise a ram air turbine which expands and thereby cools ram air which is then passed to flow between the walls of said casing.

Figure 1A:
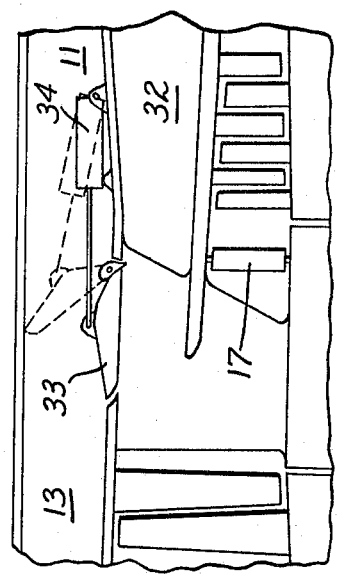

The invention is illustrated, merely by way of example, in the accompanying drawings, in which:

FIGURE 1a is a fragmentary enlarged side view of the of one embodiment of a gas turbine power plant according to the present invention, FIGURE 1a is a fragmentary enlarged side view of the plant showing the valve means 33 and its actuator 34 in its two operative positions, FIGURE 2 is a view similar to FIGURE 1, but illustrating another embodiment of the present invention, and FIGURE 3 is a broken away sectional view illustrating yet another embodiment of the present invention.

Referring first to FIGURE 1, a gas turbine power plant 10 adapted for use on a supersonic aircraft has an outer casing 11 provided at its upstream end with an air intake passage 12.

Mounted within the outer casing 11, and spaced therefrom by an annular supplementary air duct 13, is a double-walled inner casing 14. Within the inner casing 14 there is a main flow duct in which are mounted in flow series low pressure compressor inlet guide vanes 15, a low pressure compressor 16, high pressure compressor inlet guide vanes 17, a high pressure compressor 18, pimary combustion equipment 19, a high pressure turbine 20, a low pressure turbine 21, and reheat combustion equipment 22, the exhaust gases being directed to atmosphere through an exhaust passage 23 whose downstream end is provided with a nozzle 24.

The low pressure compressor 16 and the low pressure turbine 21 are mounted on a shaft 25 which is mounted coaxially within a shaft 26 on which are mounted the high pressure compressor 18 and the high pressure turbine 20.

Part, or all, of the inner casing 14 may be cooled by passing therethrough (by means not shown) a flow of ram air which has been expanded, and thereby cooled, by a ram air turbine (not shown) which may also be employed to drive a reheat fuel pump (not shown).

The inlet guide vanes 15, 17 are rotatably mounted, the inlet guide vanes 15 being rotatably mounted in a bullet-shaped nose cone 29 which is mounted coaxially of the compressor 16 and which controls the flow of air thereinto. The inlet guide vanes 15, 17 are arranged to be rotated by a common ram 30 between open positions, in which air may flow through the compressors 16, 18, and closed positions, in which flow of air through the compressors 16, 18 is prevented.

The supplementary air duct 13, which is adapted to receive ram air from the air intake passage 12, by-passes the compressors 16, 18, primary combustion equipment 19, turbines 20, 21 and reheat combustion equipment 22, the downstream end of the supplementary air duct 13 communicating with the exhaust passage 23, adjacent the nozzle 24, by way of a series of pivotally mounted flap valves 31 some of which collectively constitute the nozzle 24. The flap valves 31 may be moved by means of actuators 31a, shown diagrammatically, between a full line position in which they blank off the downstream end of the supplementary air duct 13 and a dotted line position in which they permit ram air flowing through the supplementary air duct 13 to pass into the exhaust passage 23.

An annular by-pass duct 32, which is adapted to receive compressed air from the downstream end of the low pressure compressor 16 and which is disposed inwardly of the supplementary air duct 13, surrounds the high pressure compressor 18, primary combustion equipment 19 and turbines 20, 21.

The upstream end of the by-pass duct 32 is adapted to receive ram air from the supplementary air duct 13. Communication between the ducts 13, 32 is controlled by a valve device 33. The valve device 33 may be moved by a ram 34 between a position (which is shown in full lines in FIGURE 1a) in which no ram air is passed to the by-pass duct 32 and another position (shown in broken lines in FIGURE 1a) in which all the ram air flowing through the supplementary air duct 13 is passed into the by-pass duct 32.

The downstream end of the by-pass duct 32 is formed into a plurality of angularly spaced apart chutes 37 which extend into the main flow duct within the inner casing 14 immediately upstream of the reheat combustion equipment 22. Mounted in each of the chutes 37 is a rotatably mounted vane 38 movement of which (by means not shown) alters the effective cross-sectional area of the respective chute 37.

In operation, at supersonic speeds of, for example, Mach 2.6 and above, the inlet guide vanes 15, 17 are closed by the ram 30 to prevent flow through the compressors 16, 18, the primary combustion equipment 19 is shut down, the valve device 33 is disposed in the position in which ram air from the supplementary air duct 13 passes to the by-pass duct 32, the vanes 38 are disposed in the position in which the effective cross-sectional areas of the chutes 37 are at a maximum, the flap valves 31 are disposed in the full line position shown in FIG. 1, and the reheat combustion equipment 22 is brought into operation, whereby the power plant will be operated only as a ram jet engine.

At speeds below, for example, Mach 2.6, the inlet guide vanes 15, 17 are opened by the ram 30 to permit flow through the compressors 16, 18, the primary combustion equipment 19 is maintained in operation (as may also be the reheat combustion equipment 22, if so desired) the valve device 33 is disposed in the position shown in FIG. 1, the vanes 38 are disposed in the position in which the effective cross-sectional areas of the chutes 37 are at a minimum, and the flap valves 31 are disposed in the dotted line position. The power plant will, in these circumstances, be operated only as a gas turbine engine and although the air intake passage 12 will pass very much more air than is required for gas turbine operation, this excess air will merely pass through the supplementary air duct 13 and will be supplied to the nozzle 24 where it will prevent over-expansion of the exhaust gases.

Referring now to FIG. 2, a gas turbine power plant 40 has an outer casing 41 provided at its upstream end with an air intake passage 42.

Mounted within the outer casing 41, and spaced therefrom by an annular supplementary air duct 43, is an inner casing 44. Within the inner casing 44 there is a main flow duct within which are mounted in flow series low pressure compressor inlet guide vanes 45, a low pressure compressor 46, high pressure compressor inlet guide vanes 47, a high pressure compressor 48, primary combustion equipment 49, a two-stage high pressure turbine 50, a two-stage low pressure turbine 51, and reheat combustion equipment 52, the exhaust gases being directed to atmosphere through an exhaust passage (not shown).

The low pressure compressor 46 and the low pressure turbine 51 are mounted on a shaft 53 which is mounted coaxially within a shaft 56 on which are mounted the high pressure compressor 48 and the high pressure turbine 50.

The inlet guide vanes 45, 47 are rotatably mounted and are arranged to be rotated about their axes by a common ram 45a between open positions as shown in which air may flow through the compressors 46, 48, and closed positions, at right angles to the positions shown, in which flow of air through the compressors 46, 48 is prevented.

At the upstream end of the supplementary air duct 43 there is mounted a ring of angularly spaced apart rotatable vanes 54 which may be rotated by means of actuators 54a between a position, as shown, in which ram air from the air intake passage 42 may flow through the supplementary air duct 43 and another position, at right angles to that shown, in which such flow is prevented.

An annular by-pass duct 55 is arranged to receive air which has been compressed by the low pressure compressor 46. The by-pass duct 55 by-passes the high pressure compressor 48, the primary combustion equipment 49, and the turbines 50, 51.

The downstream end of the by-pass duct 55 is formed into a plurality of angularly spaced apart chutes 57 which extend into the main flow duct within the inner casing 44 immediately upstream of the reheat combustion equipment 52. A blocking member 58 is mounted in each of the chutes 57 and (as indicated by full and dotted lines in FIG. 2) is movable into and out of the chute, by a ram 60, whereby to vary the effective cross-sectional area of the chute.

The downstream end of the supplementary air duct 43 communicates with the by-pass duct 55 by way of a valve device 61. The valve device 61 is movable by a ram 62 between a full line position in which flow through the supplementary air duct 43 is blocked, and a dotted line position in which ram air from the supplementary air duct 43 may flow to the by-pass duct 55.

In ram-jet operation, the inlet guide vanes 45, 47 are closed, the primary combustion equipment 49 is shut down, the vanes 54 are open to permit ram air to pass into the supplementary air duct 43, the valve device 61 is placed in the dotted line position, the blocking members 58 are withdrawn to their dotted line positions so as to maximise the effective areas of the chutes 57, and the reheat combustion equipment 52 is maintained in operation.

In gas turbine operation, the inlet guide vanes 45, 47 are open, the primary combustion equipment 49 (and, optionally, the reheat combustion equipment 52) are maintained in operation, the vanes 54 are closed, the valve device 61 is disposed in the full line position, and the blocking members 58 are moved inwardly to their full line position so as to minimise the effective areas of the chutes 57.

The embodiment of the invention shown in FIG. 3 is generally similar to that of FIG. 1 and for this reason will not be described in detail. Parts of the FIG. 3 embodiment which correspond to that of FIG. 1 have been given the same reference numerals with the addition of the suffix a.

In the FIG. 3 embodiment, however, the inlet guide vanes 15a are not movable to prevent flow through the low pressure compressor 16a, although rotatable inlet guide vanes 17a, movable by a ram 30a, are, as in the FIG. 1 embodiment, provided for the high pressure compressor 18a.

The low pressure compressor 16a has a bullet-shaped nose cone 65 which is mounted coaxially of and at the upstream end of the compressor 16a and which controls the flow of air thereinto. The nose cone 65 is formed of a plurality of relatively movable portions 66 which may be pivoted radially inwardly about their upstream ends by means of an actuator 66a (shown diagrammatically) relatively towards each other so as to assume the full line position shown in FIG. 3 in which air may pass through the low pressure compressor 16a. Movable flap valve elements 68 are pivotally mounted at the downstream end of the low pressure compressor 16a and movable by actuators 69 between open positions shown in full lines and closed positions shown in broken lines. The portions 66 may also, however, be pivoted radially outwardly about their upstream ends (as indicated by the dotted lines) so as to contact the inner casing 14a and thereby prevent flow of air through the low pressure compressor 16a.

The construction of the nose cone 65 may be as disclosed in our co-pending British patent application No. 11526/62.

In the FIGURE 3 embodiment, the valve device 33a is movable by actuators 34a between the positions shown in full line and broken lines corresponding to the full and broken line positions of the valve elements 68. That is to say, the valve device 33a is movable between a full line position as shown, in which it blocks the supplementary air duct 13a and permits the passage of by-pass air through the by-pass duct 32a, and a broken line position, which it occupies when the valve elements 68 are in the broken line positions in which it permits flow of ram air from the supplementary air duct 13a and into the by-pass duct 32a, while preventing the flow of air from the low pressure compressor 16a into the by-pass duct 32a.

As will be seen from FIG. 3, the high pressure compressor 18a has double walls 67, 67a between which may flow ram air which has been expanded, and thereby cooled, by a ram air turbine (not shown).

The embodiments of the invention in which an exclusive property or privilege is claimed are defined as follows:

1. Combined turbo-jet and ram-jet power plant having a flow duct which is provided in flow series with an air intake passage, compressor means, primary combustion equipment, turbine means, and reheat combustion equipment; a by-pass duct whose upstream end communicates with the compressor means so as to receive part of the air which has been compressed therein, the by-pass duct by-passing the primary combustion equipment and the turbine means, and the downstream end of said by-pass duct having at least one opening which communicates with said flow duct upstream of the reheat combustion equipment; means for varying the effective area of said opening; a supplementary air duct which is arranged to receive ram air from the air intake passage; and a valve device through which the supplementary air duct selectively communicates with the by-pass duct, so as to supply the ram air thereto, said valve device having a first operative position for ram-jet operation in which ram air passes from the supplementary air duct to the by-pass duct and therefrom to the reheat combustion equipment and a second operative position for turbo-jet operation in which the flow of ram air from the supplementary air duct into the by-pass duct is blocked.

2. Power plant as claimed in claim 1 and including flow control means, for preventing flow from the air intake passage and through the compressor means.

3. Power plant according to claim 2 wherein said flow control means comprise movable inlet guide vanes at the entry to the compressor means, and means for effecting movement of the movable inlet guide vanes between open and closed positions.

4. Power plant as claimed in claim 2 in which said flow control means comprise a member which is mounted coaxially of and upstream of the compressor means, the said member having a plurality of relatively movable portions which are movable pivotable radially outwardly and inwardly about their upstream ends to positions in which they respectively prevent and permit flow of air into the compressor means.

5. Power plant as claimed in claim 1 including flow control means for controlling flow of ram air into the supplementary air duct.

6. Power plant according to claim 1 in which said at least one opening comprises a plurality of angularly spaced apart chutes which communicate with the downstream end of the by-pass duct and which extend into the said flow duct upstream of the reheat combustion equipment and means for altering the effective cross-sectional area of each said chute.

7. Power plant as claimed in claim 1, the said valve device being settable in a first operative position in which compressed air is prevented from passing from the compressor means and into the by-pass passage and in which the supplementary air duct is open to a flow of ram air therethrough and a second operative position in which compressed air may pass from the compressor means and into the by-pass duct and in which the supplementary air duct is blocked to the flow therethrough of ram air.

References Cited by the Examiner

UNITED STATES PATENTS

| | | |
|---|---|---|
| 2,464,724 | 3/1949 | Sedelle. |
| 2,909,894 | 10/1959 | O'Donnell _____ 60—35.6 X |
| 3,019,600 | 2/1962 | Peek. |
| 3,107,690 | 10/1963 | Pope et al. |
| 3,118,276 | 1/1964 | Keenan et al. |
| 3,161,018 | 12/1964 | Sandre. |

JULIUS E. WEST, *Primary Examiner.*